United States Patent
Rinckes

(10) Patent No.: US 8,826,192 B1
(45) Date of Patent: Sep. 2, 2014

(54) GRAPHICAL METHOD OF INPUTTING PARAMETER RANGES

(75) Inventor: Douglas Rinckes, Thalwil (CH)

(73) Assignee: Google Inc., Mountain View, CA (US)

( * ) Notice: Subject to any disclaimer, the term of this patent is extended or adjusted under 35 U.S.C. 154(b) by 213 days.

(21) Appl. No.: 13/402,181

(22) Filed: Feb. 22, 2012

(51) Int. Cl.
*G06F 3/14* (2006.01)
*G06F 3/041* (2006.01)
*G09G 5/22* (2006.01)

(52) U.S. Cl.
USPC .......................... 715/864; 345/173; 345/440.2

(58) Field of Classification Search
CPC . G06Q 10/1093; G06Q 10/109; G06Q 10/10; G06F 3/0488; G06F 3/04847
See application file for complete search history.

(56) References Cited

U.S. PATENT DOCUMENTS

| | | | |
|---|---|---|---|
| 5,247,284 A | | 9/1993 | Fleming |
| 5,247,438 A | | 9/1993 | Subas et al. |
| 5,805,444 A | * | 9/1998 | Seymour .......................... 700/16 |
| 5,860,067 A | | 1/1999 | Onda et al. |
| 5,959,615 A | * | 9/1999 | Yamade et al. ............... 345/173 |
| 6,104,788 A | | 8/2000 | Shaffer et al. |
| 6,388,952 B2 | | 5/2002 | Kim |
| 6,614,450 B1 | | 9/2003 | Vossler |
| 6,782,550 B1 | | 8/2004 | Cao |
| 7,313,767 B2 | | 12/2007 | Mak |
| 7,827,490 B2 | * | 11/2010 | Kapur et al. .................. 715/716 |
| 2009/0199124 A1 | * | 8/2009 | Birch ............................ 715/772 |
| 2009/0222730 A1 | * | 9/2009 | Wixson et al. ................ 715/723 |
| 2010/0217418 A1 | | 8/2010 | Fontanot |

OTHER PUBLICATIONS

Iosnoops, miCal—missing Calendar by entwicklungsschmiede UG & Co KG, web site, Jan. 6, 2012, http://www.iosnoops.com/appinfo/mical-missing-calendar-for-iphone/392290576.

Calengoo, Easy access to your Google Calendar with your iPhone, iPod Touch, and iPad, web site, Jan. 6, 2012, http://www.calengoo.dgunia.de/Start.html.

Apple Insider, Inside Apple's iOS 5: Calendar improvements help make iPhone, iPad PC-free, web site, Jan. 6, 2012, http://www.appleinsider.com/articles/11/06/08/inside_apples_ios_5_calendar_improvements_help_make_iphone_ipad_pc_free/.

Notice of Allowance from U.S. Appl. No. 13/304,992, dated Dec. 23, 2013, 16 pp.

Office Action from U.S. Appl. No. 13/304,992, dated Jul. 17, 2013, 26 pp.

Response to Office Action from U.S. Appl. No. 13/304,992, dated Jul. 17, 2013, filed Aug. 16, 2013, 15 pp.

(Continued)

*Primary Examiner* — Kee M Tung
*Assistant Examiner* — Nicholas R Wilson
(74) *Attorney, Agent, or Firm* — Shumaker & Sieffert, P.A.

(57) ABSTRACT

Disclosed are methods and apparatuses for receiving the input of parameter ranges into computing devices. In one embodiment, a method is disclosed for accepting user input of a time range into a computing device equipped with a touchscreen. The method includes displaying a time bar on the touchscreen and receiving a touch input ending at a first location and a second touch input ending at a second location. The computing device displays time markers at the first and second locations. The method further includes identifying first and second times corresponding to the first and second locations and a time range including the first and second times. The method further includes receiving a third touch input commencing at one of the time markers and terminating at a third location. The method further includes updating the time marker at the position of the third location and updating the time range.

21 Claims, 10 Drawing Sheets

(56) References Cited

OTHER PUBLICATIONS

Office Action from U.S. Appl. No. 13/304,992, dated Oct. 10, 2013, 25 pp.

Response to Office Action from U.S. Appl. No. 13/304,992, dated Oct. 10, 2013, filed Dec. 10, 2013, 10 pp.

Notice of Allowance from U.S. Appl. No. 13/304,992, dated Apr. 18, 2014, 14 pp.

* cited by examiner

FIG. 4A
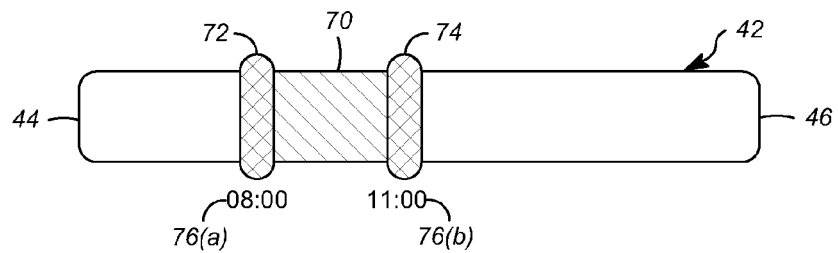
FIG. 4B
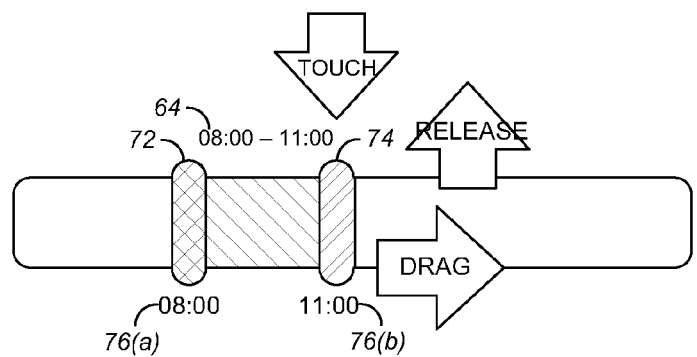
FIG. 4C
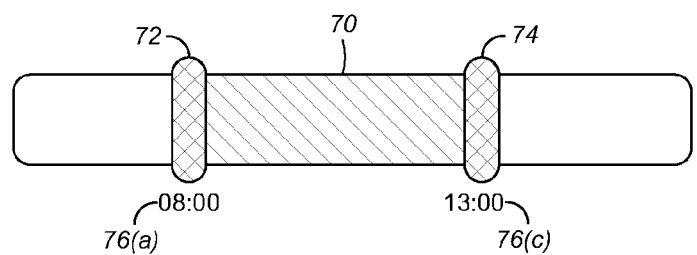
FIG. 4

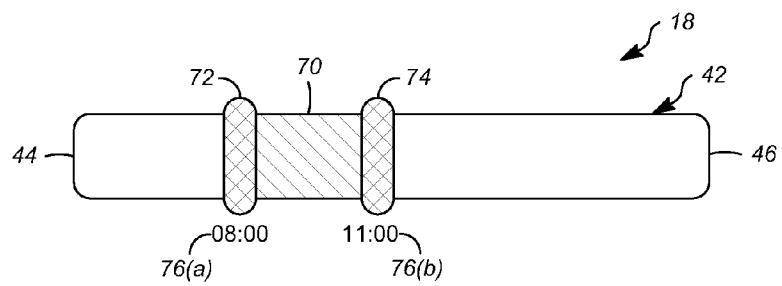
FIG. 5A
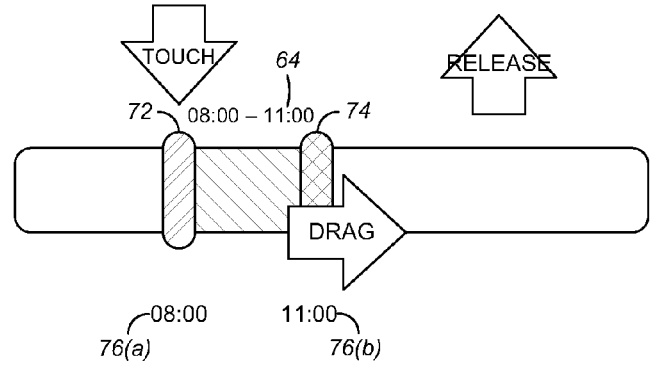
FIG. 5B
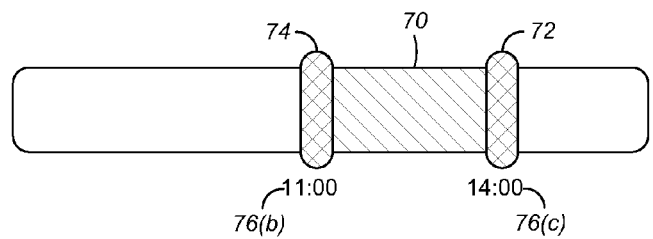
FIG. 5C
FIG. 5

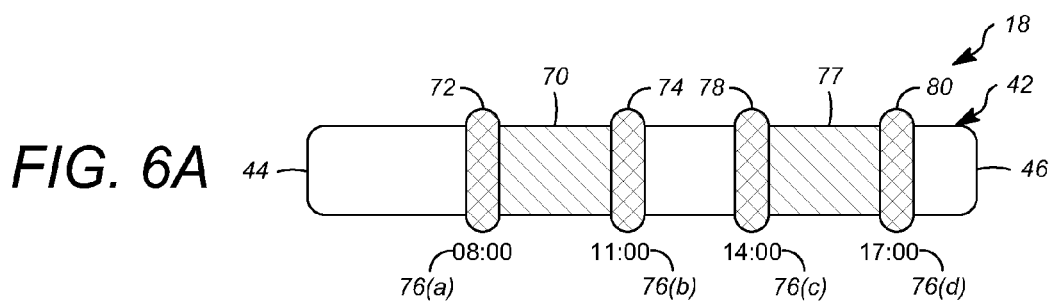
FIG. 6A
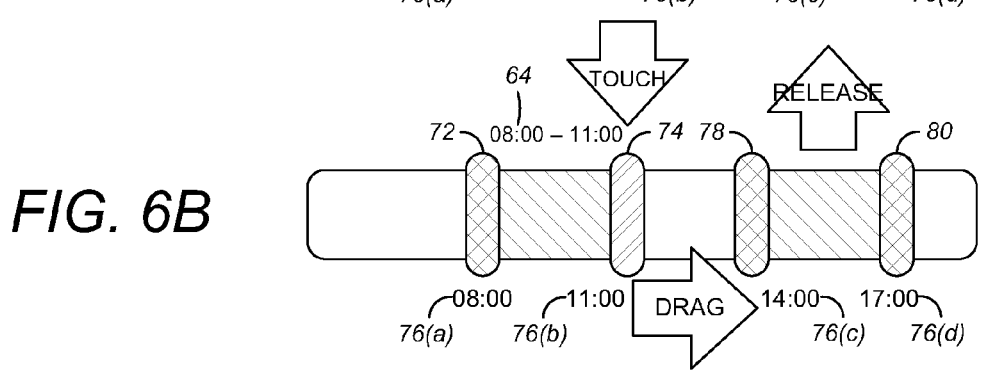
FIG. 6B
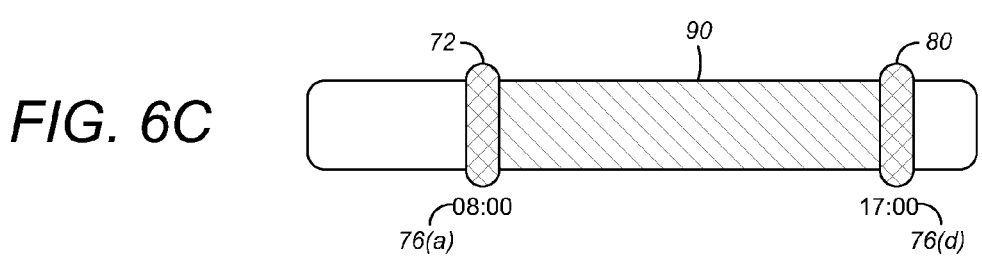
FIG. 6C
FIG. 6

*FIG. 7*

FIG. 8A
FIG. 8B
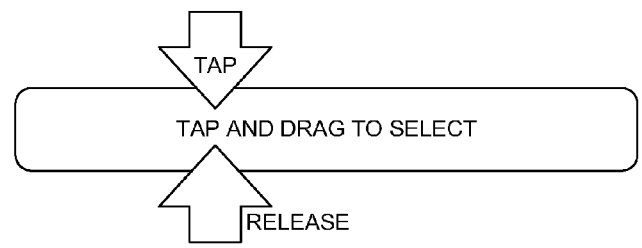
FIG. 8C
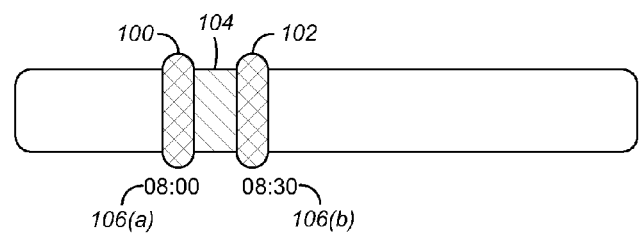
FIG. 8

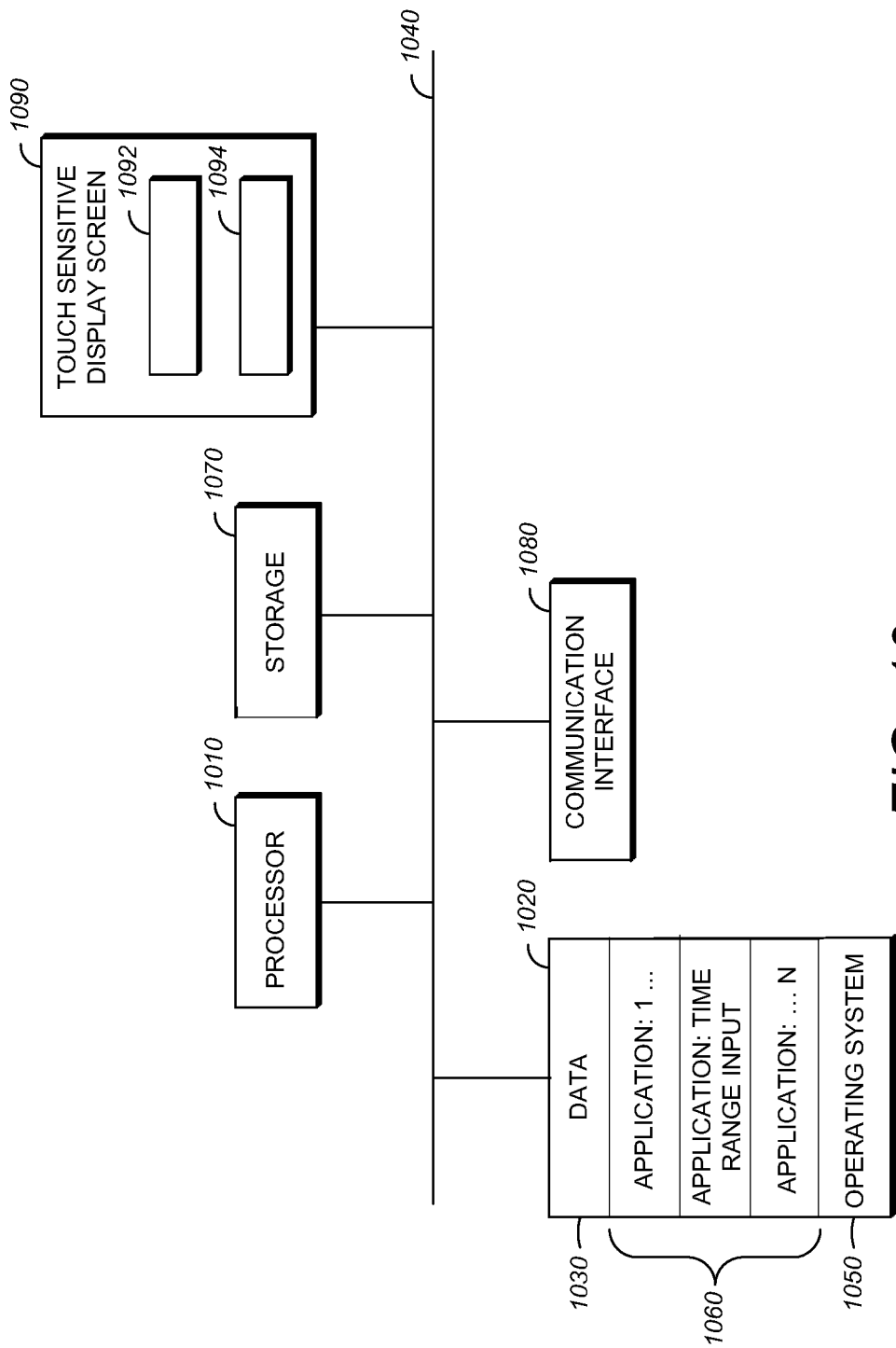

GRAPHICAL METHOD OF INPUTTING PARAMETER RANGES

RELATED APPLICATIONS

This application is related to co-pending application Ser. No. 13/304,992 filed Nov. 28, 2011 and entitled "METHOD AND APPARATUS FOR ENTERING A DATA RANG" and Application Ser. No. 61/601,735 filed Feb. 22, 2012 and entitled "SELECTING PARAMETER RANGES".

TECHNICAL FIELD

The disclosure relates generally to the field of graphical computer interfaces including, for example, methods of receiving the input of parameter ranges on small screen devices.

BACKGROUND

Some computer applications require entering of parameter ranges, for example, the opening hours of a shop or the time and duration of a meeting. One common method for entering these ranges is by the use of text. For example, applications can provide text input fields for the opening time and the closing time of the shop. Other applications, for example, project management programs and personal scheduling programs, support the entry of time ranges graphically. These programs typically provide a time grid for the entry of time ranges. The grids typically have a time scale across the top and multiple rows underneath the time scale, to allow for the entry of individual time ranges, with a row dedicated to each time range.

SUMMARY

Disclosed here are embodiments of methods and apparatuses for receiving the input of parameter ranges for computer applications. One aspect of the disclosed embodiments is a method for accepting user input of at least one time range into a computing device having a touchscreen. The method includes displaying a time bar on the touchscreen. The time bar has a first end, a second end, and a spatial range between the first end and second end. The method further includes receiving a first touch input on the touchscreen terminating at a first location in the spatial range. The computing device displays a first time marker at the first location on the time bar. The method further includes receiving a second touch input on the touchscreen terminating at a second location in the special range. The computing device displays a second time marker at the second location.

The method further includes identifying a first time based on the position of the first location and a second time based on the position of the second location within the spatial range. The method further includes identifying a time range that includes the first time and the second time. The method further includes receiving a third touch input on the touchscreen commencing at one of the first time marker and the second time marker and terminating at a third location in the spatial range. The computing device displays one of the first time marker and the second time marker at the third location. The method further includes updating one of the first time and the second time based on the position of the third location within the spatial range and updating the time range to include the updated one of the first time and the second time.

Another aspect of the disclosed embodiments is a method for accepting user input to remove at least one time range into a computer device having a touchscreen. The method includes displaying a time bar on the touchscreen. The time bar has a first end, a second end, and a spatial range between the first end and second end. The method further includes receiving a first touch input that ends at a first location in the spatial range. The computing device displays a first time marker at the first location. The method further includes receiving a second touch input that ends at a second location in the spatial range. The computing device displays a second time marker at the second location.

The method further includes identifying a first time based on the position of the first location and a second time based on the position of the second location within the spatial range. The computing device identifies a time range that includes the first time and the second time. The method further includes receiving a third touch input on the touchscreen commencing at one of the first time marker and the second time marker and terminating at the other one of the first time marker and the second time marker. The method further includes removing the first time marker and the second time marker and the time range from the time bar.

Another aspect of the disclosed embodiments is a method for accepting user input to merge at least two time ranges into a computing device having a touchscreen. The method includes displaying a time bar on the touchscreen. The time bar has a first end, a second end, and a spatial range between the first end and second end. The method further includes receiving a first touch input that ends at a first location in the spatial range. The computing device displays a first time marker at the first location. The method further includes receiving a second touch input that ends at a second location in the spatial range. The computing device displays a second time marker at the second location. The method further includes identifying a first time based on the position of the first location and a second time based on the position of the second location within the spatial range. The method further includes identifying a first time range that includes the first time and the second time.

The method further includes receiving a third touch input on the touchscreen that ends at a third location in the spatial range. The computing device displays a third time marker at the third location. The method further includes receiving a fourth touch input that ends at a fourth location in the spatial range. The computing device displays a fourth time marker at the fourth location. The method further includes identifying a third time based on the position of the third location and a fourth time based on the position of the fourth location within the spatial range. The computing device identifies a second time range that includes the third time and the fourth time.

The method further includes receiving a fifth touch input on the touchscreen commencing at the second time marker and crossing over the nearest one of the third time marker and fourth time marker and terminating at a fifth location that is within the second time range. The computing device removes the second time marker and the nearest one of the third time marker and fourth time marker from the time bar. The method further includes updating the first time range to include the first time and the furthest one of the third time and the fourth time.

Another aspect of the disclosed embodiments is an apparatus for inputting a time range. The apparatus includes a touchscreen and a processor in communication with the touchscreen. The processor is configured to display on the touchscreen a time bar having a first end, a second end, and a spatial range intermediate the first and second ends. The processor is further configured to receive a first touch input on the touchscreen that ends at a first location in the spatial range.

The apparatus displays on the touchscreen a first time marker at the first location. The processor is further configured to receive on the touchscreen a second touch input that ends at a second location in the spatial range. The apparatus displays on the touchscreen a second time marker at the second location. The processor is further configured to identify a first time based on the position of the first location and a second time based on the position of the second location.

The processor is further configured to identify a time range including the first time and the second time. The processor is further configured to receive a third touch input on the touchscreen commencing at one of the first time marker and the second time marker and terminating at a third location in the spatial range. The apparatus displays on the touchscreen one of the first time marker and the second time marker at the third location. The processor is further configured to update one of the first time and the second time based on the position of the third location within the spatial range. The processor is further configured to update the time range to include the updated one of the first time and the second time.

BRIEF DESCRIPTION OF THE DRAWINGS

The various features, advantages and other uses of the present disclosure will become more apparent by referring to the following detailed description and drawings in which:

FIGS. 3A-3F are displays used by the computing device of FIG. 2A for entering time ranges;

FIGS. 4A-4C are displays used by the computing device of FIG. 2A for modifying time ranges;

FIGS. 5A-5C are displays used by the computing device of FIG. 2A for reversing time ranges;

FIGS. 6A-6C are displays used by the computing device of FIG. 2A for merging time ranges;

FIGS. 8A-8C are displays used by the computing device in FIG. 2A for entering time ranges;

FIG. 10 is a block diagram showing a conventional computing device including a touchscreen.

DETAILED DESCRIPTION

The disclosure herein is directed to apparatus and methods for receiving graphical input of parameter ranges (including, for example, time and date ranges) for computer applications including those running on small screen devices. The description below addresses entering time ranges into computer applications. The apparatus and methods disclosed, however, can be used generally to enter any other type of parameter ranges. The disclosed apparatus and methods are effective in a wide range of devices, including for example mobile devices equipped with small touch-sensitive display screens. Existing user interfaces are not always well-suited for use on devices such as mobile telephones with small, touch sensitive display screens owing to the small size of objects displayed on the screens relative to a user's finger.

Figure 1:
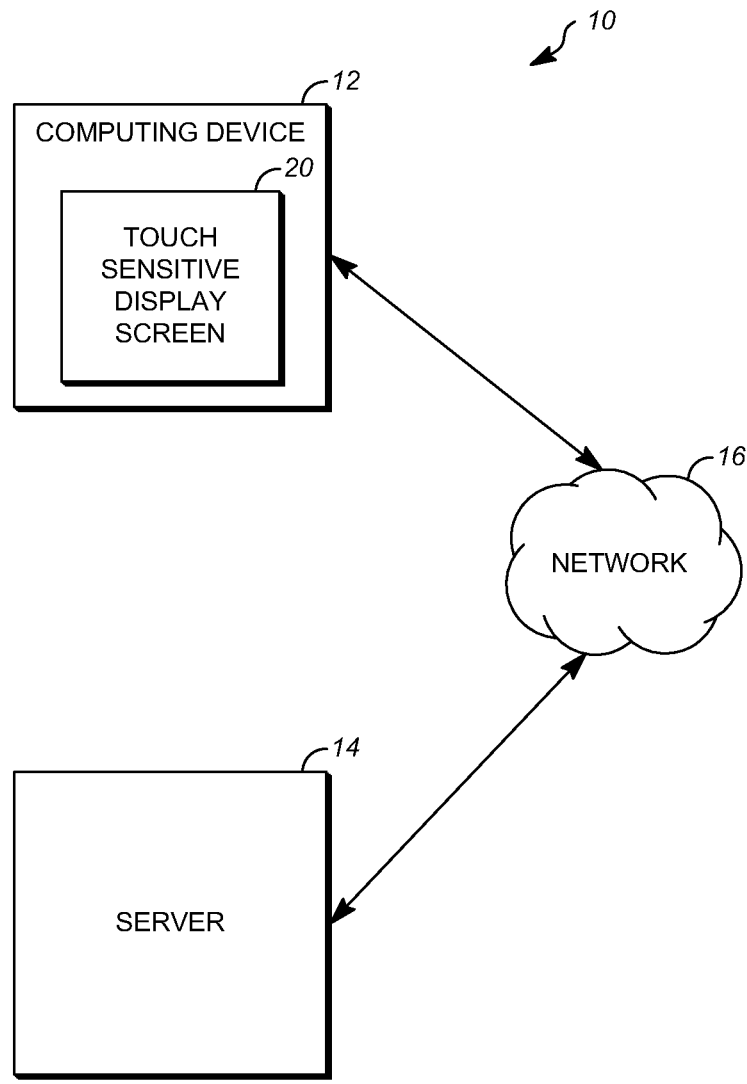
FIG. 1 is a block diagram of a system for inputting time ranges.

FIG. 1 is a block diagram of a system 10 for receiving parameter ranges. System 10 includes a computing device 12 and is connected to a server 14 via a network 16. Computing device 12 is operable to receive graphical input from a user and exchange data with the server 14 via network 16. In one exemplary embodiment, computing device 12 is a processor equipped handheld computer such as a smart phone; however, it should be understood that computing device 12 can be any device capable of accepting user input and processing information. In this exemplary embodiment, computing device 12 includes a user input-output functionality in the form of a touch sensitive display screen, or touchscreen 20.

Touchscreen 20 displays object (such as icons) and permits use of computing device 12 to select and manipulate those objects and otherwise input commands and data by touching the surface of touchscreen 20, such as by tapping touchscreen 20 with a finger for example or by sliding a finger along the surface of touchscreen 20. Touch inputs to touchscreen 20 can also be effected by the user's manipulation of a stylus, pen or other object.

Other techniques of data input can be employed to permit a user to select and manipulate displayed objects through gestures of user's hand. For example, in some embodiments, the user can select and manipulate objects by means of a mouse, trackball or mouse pad. In other embodiments, the user can select and manipulate objects by means of gestures without physical contact with computing device 12.

In other embodiments, the computing device 12 can receive input without physical contact in the form of gestures from the user such as the user's hand approaching the touchscreen 20, moving away from the touchscreen 20, or passing over the touchscreen 20. Such devices can be implemented for example by placing a transmitter on the user's hand to communicate the movement of the hand wirelessly to the computing device. Inputs that can be received from a touchscreen 20 include any type of touch or gesture such as direct touches, indirect (using a stylus or other object), pressure on the touchscreen 20, and speed, acceleration, direction of movement or change of direction of movement of a user's hand or other activation device. One exemplary implementation of computing device 12 is described in detail below.

The computing device 12 and the server 14 can be connected for communication with one another by the network 16. The communication functions described herein can be accomplished using any kind of network or communications means capable of transmitting data or signals. Suitable examples include the internet, which is a packet-switched network, a local area network (LAN), wide area network (WAN), virtual private network (VPN), or any other means of transferring data. A single network or multiple networks that are connected to one another can be used. It is specifically contemplated that multiple networks of varying types can be connected together and utilized to facilitate the communications contemplated by the systems and elements described in this disclosure. The server 14 is operable to implement computer applications and may represent any type of computer, computer system or other programmable device, including a server computer, a portable computer, an embedded controller, a PC-based server, a minicomputer, a midrange computer, a mainframe computer, and other computers adapted to support the methods and apparatus of this invention. One exemplary implementation of a server is described in detail below.

The computer applications that utilize the time range inputs can be installed on the server 14, or on the computing device 12. The computer applications that utilize the time range inputs can also be distributed such that a portion of one or more of the applications is implemented on the server 14 and another portion of the application is implemented on the computing device 12.

The computing device 12 is operable to output time ranges to one or more applications on the computing device 12 and to receive data from the applications for use in implementing the time range input function. The computing device 12 is also operable to output the time ranges to one or more applications installed on the server 14 via the network 16 and to receive data from the server 14 via the network for implementing the time range input function.

All or a portion of the embodiments of the present invention can take the form of a computer program product accessible from, for example, a computer-usable or computer-readable storage medium. A computer-usable or computer-readable storage medium can be any device that can, for example, tangibly contain, store, communicate, or transport the program for use by or in connection with any processor. The medium can be, for example, an electronic device, magnetic device, optical device, electromagnetic device, or semiconductor device or signal. Other suitable mediums are also available.

Figure 2A:
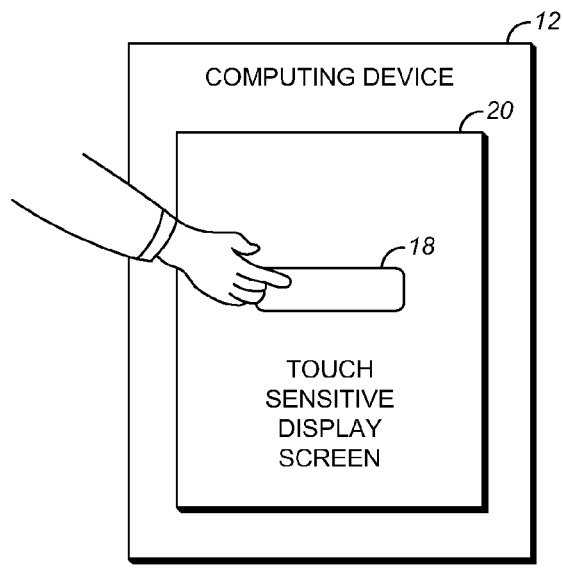
FIG. 2A is a perspective view of the computing device used in FIG. 1.

FIG. 2A is a perspective view of the computing device 12 used in FIG. 1. FIG. 2A illustrates one embodiment of a user inputting data on the computing device 12 wherein the computing device 12 uses a touchscreen 20 to implement the time entry interface 18. In another embodiment described in detail below, the user can enter time ranges by touching the touchscreen 20. The user can use a finger or a stylus or other similar device to touch the touchscreen 20.

Time Entry Interface

Figure 2B:
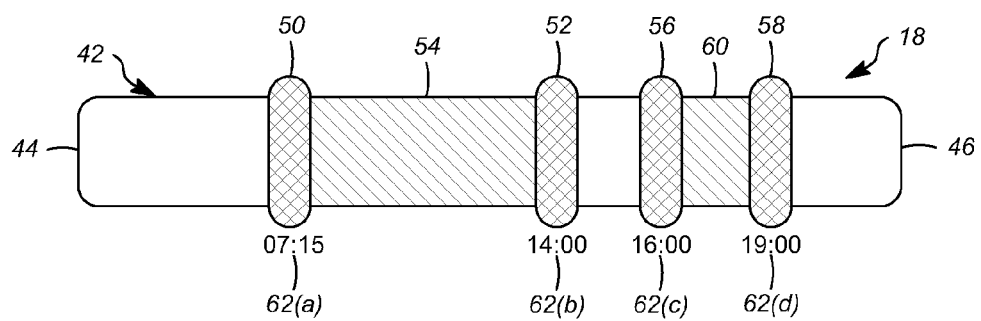
FIG. 2B is a detailed drawing of the time entry interface used by the computing device of FIG. 2A.

FIG. 2B illustrates the time entry interface 18. Interface 18 can include a time bar 42. Time bar 42 is shown as an elongated rectangle oriented horizontally on the touchscreen 20. Time bar 42 can be any other suitable shape such as a square, a circle or the circumference of a circle. Time bar 42 can also be oriented vertically, diagonally, or at any other angle on the touchscreen 20. Time bar 42 can present a graphic representation of a 24 hour day, with the left end 44 representing 00:00 and the right end 46 representing 24:00. Time bar 42 can be used for any other temporal range such as an hour, twelve hours, a week, a month, or a year. Time bar 42 can be displayed in a base color and have a left end 44 and a right end 46 where the left end 44 corresponds to the beginning of the temporal range and the right end 46 corresponds to the end of the temporal range.

In the embodiment shown in FIG. 2B, the time entry interface 18 displays a first time marker 50 and a second time marker 52, defining respectively the start time and end time of a first time range 54. The first time range 54 can be displayed in a color that differs from the background of time bar 42. Likewise, the first time marker 50 and the second time marker 52 can be shown in a different color to distinguish them from the time bar 42 and the first time range 54. The time entry interface 18 also displays a a third time marker 56 and a fourth time marker 58, defining respectively the start time and end time of a second time range 60.

The time entry interface 18 can further display time indicia 62(*a*)-(*d*), each associated with one of the time markers. Time indicia 62(*a*) can be associated with first time marker 50, time indicia 62(*b*) can be associated with second time marker 52, time indicia 62(*c*) can be associated with third time marker 56, and time indicia 62(*d*) can be associated with fourth time marker 58. Each indicia 62(*a*)-(*d*) can display the time corresponding to the associated time marker.

Entering Time Ranges

Generally, a time range is defined by a start time and an end time. The start time and end time can be selected graphically by sequentially selecting two locations on time bar 42. Each location on time bar 42 corresponds to one of the start time and end time, with the location closest to the left end 44 of time bar 42 corresponding to the start time and the location closest to the right end 46 of time bar 42 corresponding to the end time of the time range. The start and end times are entered in pairs and can be entered in either order.

Computing device 12 can display a time marker (such as time markers 50 and 52 as shown in FIG. 2B) at the location of each of the start and end times of a time range. For example, in FIG. 2B, first time marker 50 and second time marker 52 are displayed respectively at the start time and end time of first time range 54 and serve as graphical markers. In addition, the time markers are active elements of the time entry interface 18. As described below, the first time marker 50 and the second time marker 52 are selectable, and can be moved within the time entry interface 18 to edit time ranges, merge time ranges, and eliminate time ranges. The time markers (such as first time marker 50 and second time marker 52) can be of sufficient size to facilitate being selected and moved on the computing device 12.

A time marker placement on the touchscreen 20 can be used for identifying a time. A time marker placement can include an initial touch input at an initial position on the touchscreen 20, an optional drag input to a second position, and a release input. The terms touch and touch input encompass any type of touch or other input command in which a cursor, mouse pointer or other selection device is placed onto a given location on the touchscreen 20 with the effect of entering or selecting an object. For example, a mouse pointer can perform a touch input by placing the mouse pointer at an initial location on the touchscreen 20 and pressing and holding the left mouse button. For another example, a finger or stylus can perform a touch input by touching the touchscreen 20 at an initial location and maintaining the finger or stylus on the touchscreen 20. The terms drag and drag input encompass any type of input command in which a cursor, mouse pointer or other selection device is moved from an initial location where an object has been entered or selected, to a second location, while continuing to select the object. For example, a mouse pointer can perform a drag input by moving the mouse pointer from an initial location to a second location while continuing to depress the left mouse button. For another example, a finger or stylus can perform a drag input by moving from the initial touch location to a second location while maintaining contact with the touchscreen 20. The terms release and release input encompass any type of input command in which a selected object is unselected. For example, a mouse pointer can perform a release input by releasing (ceasing to press) the left mouse button following a touch or a touch-and-drag input. For another example, a finger or stylus can perform a release input by discontinuing contact with the touchscreen 20 following a touch or touch-and-drag input. Other touch, drag, and release gestures or techniques whether now existing or hereinafter developed can be used to practice the disclosed subject matter.

In one example, computing device 12 can display a time marker upon the initial touch input on the time bar 42. Computing device 12 can display the time marker in a first color to indicate that the time marker is selected. During the optional drag input, computing device 12 can animate the time marker so that it tracks the drag input. The user can terminate a time marker placement by a release input at a release position. The release position can be either the initial position, or if an optional drag is performed, the second position. Upon receipt of the release input from the user, computing device 12 can place the time marker on time bar 42 at the release position.

Computing device 12 can display the time marker in a different color from the first color to show that the time marker is no longer selected. In the description below, the process described above will be referred as a time marker placement.

Figure 3A:

FIG. 3A illustrates the time entry interface 18 before any time ranges have been entered. Interface 18 includes time bar 42 having left end 44 and right end 46.

Figure 3B:
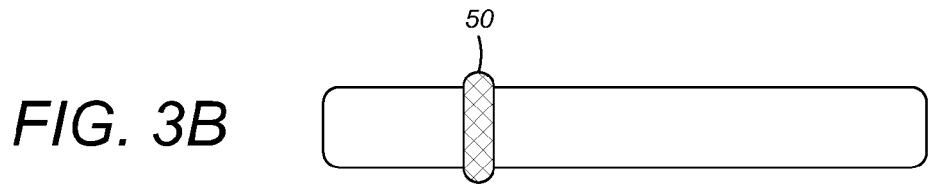

FIG. 3B illustrates entering the first time marker 50. The computing device 12 receives a first time marker placement at a first location and places the first time marker 50 at the first location. Computing device 12 displays the time indicia 62(a) below the first time marker 50. Time indicia 62(a) displays numerically a first time corresponding to the first location. In this case, the first time is 07:15.

Figure 3C:
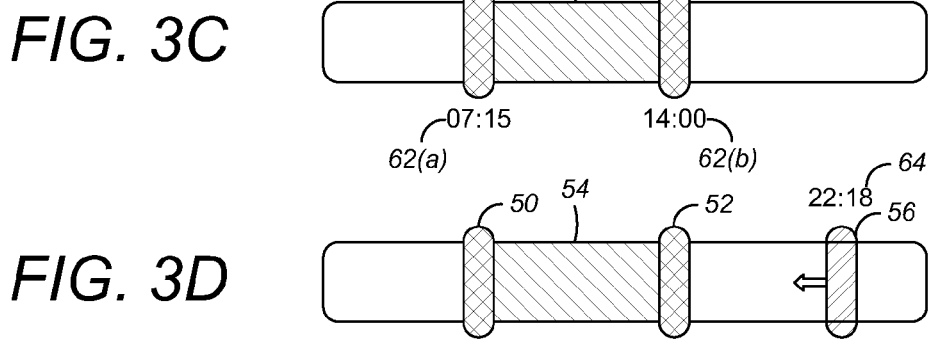

FIG. 3C illustrates entering the second time marker 52. The computing device 12 receives a second time marker placement at a second location. The computing device 12 displays the second time marker 52 at the second location and the time indicia 62(b) below second time marker 52. Time indicia 62(b) displays numerically a second time corresponding to the second location. In this case, the second time is 14:00. In addition, the computing device 12 displays first time range 54 extending from the first time marker 50 to the second time marker 52. The first time range 54 is displayed in a different color from the base color of time bar 42.

FIG. 3D illustrates entering a third time marker 56, and illustrates the appearance of the time entry interface 18 during the optional drag input of the time marker placement. Computing device 12 can display third time marker 56 in a first color to indicate that the time marker is selected. Computing device 12 can display a numeric time display 64 above the time bar 42. Computing device 12 can periodically update the numeric time display 64 during the drag input, displaying numerically the time corresponding to the current position of the drag input. In this case, the numeric time display 64 shows 22:18, corresponding to the current drag input position.

Figure 3E:
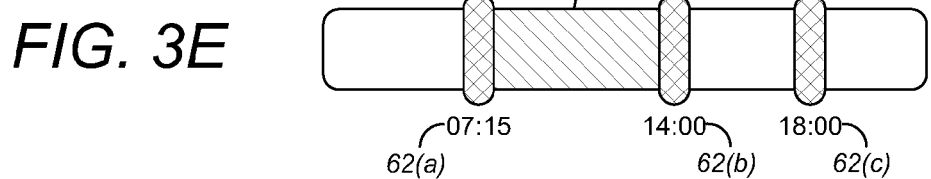

As shown in FIG. 3E, upon receipt of the release input of the time marker placement, computing device 12 can display the third time marker 56 at the third location. Computing device 12 can display third time marker 56 in a different color from the first color to indicate that it is no longer selected. Computing device 12 can display a time indicia 62(c) below the third time marker 56. Time indicia 62 (c) displays numerically the third time, corresponding to the third location. In this case, the third time is 18:00.

Figure 3F:
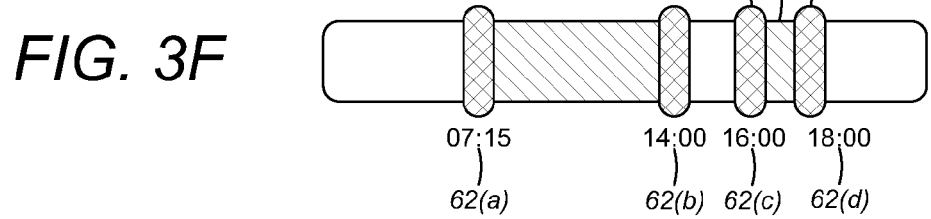

FIG. 3F illustrates entering fourth time marker 58. Computing device 12 can receive a fourth time marker placement at a fourth location. The computing device 12 can display the fourth time marker 58 at the fourth location and a time indicia 62(d) below the fourth time marker 58. Time indicia 62(d) can display a fourth time corresponding to the fourth location. In this case, the fourth time is 16:00. In addition, computing device 12 can display a second time range 60 extending from the third time marker 56 to the fourth time marker 58. The second time range 60 is displayed in a different color from the base color of the time bar 42.

Modifying Time Ranges

FIGS. 4A-4C are displays used by the computing device 12 of FIG. 2A for modifying time ranges. The user modifies a previously defined time range by changing the start time or end time associated with the time range. This is done by selecting and dragging the associated time marker.

FIG. 4A shows the time entry interface 18 displaying time bar 42. Interface 18 can display a first time range 70 with a first time marker 72 at a first location and a second time marker 74 at a second location, defining, respectively, the start and end time for the time range 70. The time indicia 76(a) and 76(b) can display, respectively, the start time associated with the first time marker 72 and the end time associated with the second time marker 74.

As shown in FIG. 4B, to change the end time, the user can select the second time marker 74. The user selects the second time marker 74 by touching the touchscreen 20 at the second location. Computing device 12 can receive the select input and display the second time marker 74 in a different color to indicate that it is selected. Computing device 12 can additionally display the numeric time display 64 above time bar 42. The numeric time display 64 displays numerically the start time and the end time of the time range 70. After selecting the second time marker 74, the user can drag the second time marker 74 to a third location corresponding to a revised end time. During the drag input, computing device 12 can animate the second time marker 74 to show the second time marker 74 tracking the drag input. Computing device 12 can display the time range 70 expanding or contracting, depending on the direction of the drag input. When the user has reached the desired third location corresponding to a new end time, the user can release the second time marker 74.

In FIG. 4C, the computing device 12 can display the second time marker 74 at the third location. The device displays the second time marker 74 in a different color to indicate that it is no longer selected. Computing device 12 can display the time indicia 76(c) below the third location. The time indicia 76(c) displays the new end time for the time range 70. In this case, the new end time is 13:00.

Reversing Time Ranges

FIGS. 5A-5C are displays used by the computing device of FIG. 2A for reversing the time range. In one exemplary embodiment, the time range is reversed by flipping it around one of the time markers associated with the time range, such that the roles of the time markers are reversed. For example, if a time marker marks the start time of a time range prior to reversing the time range, the marker will mark the end time following the reversal of the time range. Reversing the time range can be performed by selecting a first time marker on one side of a time range, dragging it toward and across a second time marker on the other side of the time range, and placing the first time marker at a new location on the other side of the second time marker. One example of reversing the time range is described in detail below.

FIG. 5A shows an example time entry interface 18 displaying time bar 42. The time bar 42 displays time range 70 with first time marker 72 at a first location and a second time marker 74 at a second location. First time marker 72 and second time marker 74 identify, respectively, the start time and end time for time range 70. Time indicia 76(a) and 76(b) can display, respectively, the start time associated with the first time marker 72 and the end time associated with the second time marker 74. In this example time indicia 76(a) is 08:00 and time indicia 76(b) is 11:00.

FIG. 5B illustrates reversing the time range 70 shown in FIG. 5A. The user can select the first time marker 72 by touching the touchscreen 20 at the first location. Computing device 12 can receive the touch and display first time marker 72 in a different color to indicate that first time marker 72 is selected. Computing device 12 can additionally display the numeric time display 64 above time bar 42. The numeric time display 64 displays numerically the start time and end time of the time range 70. After selecting the first time marker 72, the user can drag the first time marker 72 from one side of the time range 70 across the second time marker 74 to a third location on the opposite side of the second time marker 74.

In the example shown in FIG. 5A-5C, the first time marker 72 is moved from the left side of the second time marker 74 before the reversal (FIG. 5A) to the right side of the second time marker 74 after the reversal (FIG. 5C). During the drag input, the computing device 12 can animate the first time marker 72 to show the first time marker 72 tracking the drag input. Computing device 12 can show the time range 70 changing to reflect the changing position of the first time marker 72. When the user has reached the third location corresponding to the new intended end time, the user can release the drag input. Computing device 12 can place the first marker 72 at the third location.

As shown in FIG. 5C, the first time marker 72 now marks the end time of time range 70 and the second time marker 74 marks the start time. Computing device 12 can display the first time marker 72 in a different color to indicate that it is no longer selected. Computing device 12 can display the time indicia 76(c) below the third location. The time indicia 76(c) can display the new end time for time range 70. In this case, the new end time is 14:00.

Merging Time Ranges

FIGS. 6A-6C are displays used by the computing device 12 of FIG. 2A for merging time ranges. The user can merge two previously defined time ranges into one time range by selecting a time marker associated with a first time range and dragging it into a second time range outside of the first time range. The first and second time ranges are merged into a single time range.

FIG. 6A shows the time entry interface 18 displaying time bar 42. Time bar 42 can display a first time range 70 with a first time marker 72 at a first location and a second time marker 74 at a second location. The first time marker 72 and the second time marker 74 can define, respectively, the start time and end time for the first time range 70. Time indicia 76(a) and 76(b) can display numerically the respective start and end times for first time range 70. In addition, time bar 42 can display a second time range 77 with a third time marker 78 and a fourth time marker 80. The third time marker 78 and the fourth time marker 80 can define, respectively, the start time and end time for the second time range 77. The time indicia 76(c) and 76(d) can display numerically the respective start time and end time for second time range 77.

FIG. 6B illustrates the user merging first time range 70 with second time range 77. The user can select the second time marker 74 by touching the touchscreen 20 at the second location. The computing device 12 can receive the touch input and display the second time marker 74 in a different color to indicate that the second marker 74 is selected. After selecting the second time marker 74, the user can drag the second time marker 74 to a fifth location at a position on the second time range 77. During the drag input, the computing device 12 can animate the second time marker 74 to show the second time marker 74 tracking the drag input. Computing device 12 can display the time range 70 expanding. When the user has reached the fifth location, the user can release the drag input.

FIG. 6C shows that the computing device 12 can remove the second time marker 74 and the third time marker 78 once the first time range 70 and second time range 77 have been merged. Computing device 12 can display the merged time range 90 that extends from the first location to the fourth location. The time indicia 76(a) and 76(d) can display, respectively, the start time and end time of the merged time range 90.

Deleting Time Ranges

Figure 7A:
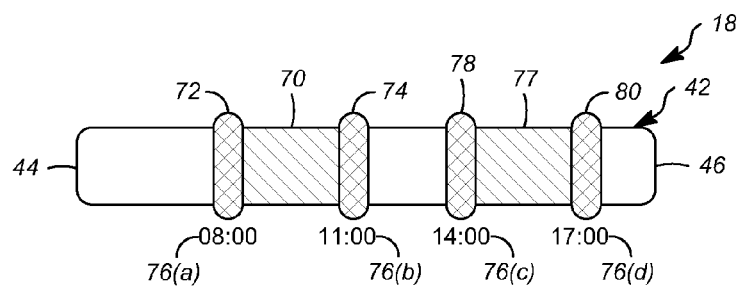
FIGS. 7A-7C are displays used by the computing device of FIG. 2A for deleting time ranges.
Figure 7B:
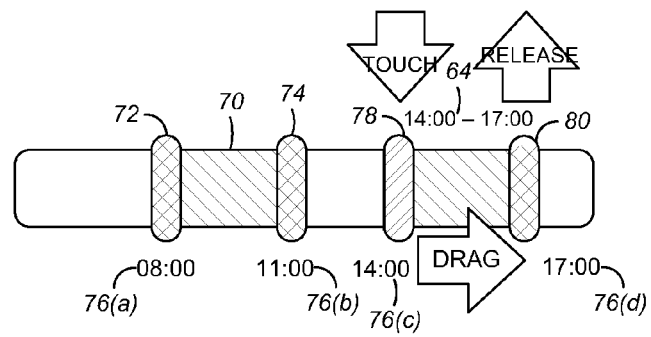
Figure 7C:
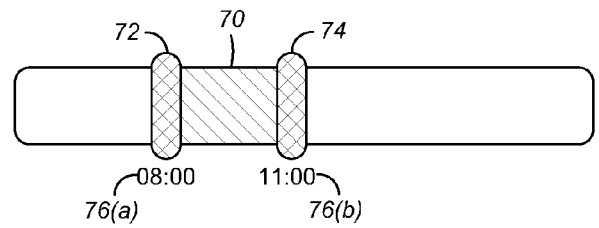

FIGS. 7A-7C are displays used by the computing device of FIG. 2A for deleting a time range. In one embodiment, the user can delete a previously defined time range by selecting one time marker associated with a previously defined time range and superimposing it on the other time marker associated with the time range.

FIG. 7A shows the time entry interface 18 displaying time bar 42. Time bar 42 can display a first time range 70 with a first time marker 72 at a first location and a second time marker 74 at a second location. First time marker 72 and second time marker 74 can define, respectively, the start time and end time for the first time range 70. The time indicia 76(a) and 76(b) can display numerically the respective start time and end time for first time range 70. In addition, time bar 42 can display a second time range 77 with a third time marker 78 and a fourth time marker 80. The third time marker 78 and fourth time marker 80 can define, respectively, the start and end time for the second time range 77. The time indicia 76(c) and 76(d) can display numerically the respective start time and end time for the second time range 77.

FIG. 7B illustrates the user eliminating the second time range 77. The user can select the third time marker 78 by touching the touchscreen 20 at the third location. The computing device 12 can receive the touch input and display the third time marker 78 in a different color to indicate that the third time marker 78 is selected. After selecting third time marker 78, the user can drag the third time marker 78 to the fourth location and superimpose the third time marker 78 on the fourth time marker 80. During the drag input, the computing device 12 can animate the third time marker 78 to show the third time marker 78 tracking the drag input. The computing device 12 can display the second time range 77 contracting. When the user has reached the fourth location, the user can release the third time marker 78.

As shown in FIG. 7C, the computing device 12 can remove the second time range 77 and associated time markers 78 and 80 from the time bar 42.

Single Tap Entry of Time Ranges

FIGS. 8A-8C are displays used by the computing device of FIG. 2A for entering a time range using a single tap input. A tap input can consist of a touch input at a location on the time bar 42 followed by an immediate release input. The user can enter a time range by tapping the time bar 42. The computing device 12 can receive the tap input and display a time range in the vicinity of the tap including a first time marker at a start time and a second time marker at an end time. The time range can be for a fixed amount of time such as one hour. This procedure is described in detail below.

FIG. 8A shows the time entry interface 18 displaying the time bar 42 including the left end 44 and right end 46.

FIG. 8B shows the entry of a time range. The user can tap the time bar 42 at a reference position. Computing device 12 can receive the tap input and identify a reference location and a reference time associated with the reference location. Computing device 12 can determine a start time that is, for example, fifteen minutes before the reference time and an end time that is, for example, fifteen minutes after the reference time. Computing device 12 can identify a first location corresponding to the start time and a second location corresponding to the end time. Other approaches can be used for determining the start time and end time. For example, the computing device 12 can define the start time to be the reference time and the end time to be ten minutes after the start time.

As shown in FIG. 8C, the device can display a first time marker 100 at the first location and a second time marker 102 at the second location. The computing device 12 can display the time range 104 extending from the first time marker 100 to the second time marker 102. The computing device 12 can display the time indicia 106(*a*) and 106(*b*) below the first location and the second location, respectively. The time indicia 106(*a*) and 106(*b*) can display the start time and end times of time range 104, in this case 8:00 and 8:30, respectively.

Display Options

The description above describes one set of display options for the time entry interface 18. The description is not limiting, and many other sets of display options are possible. The time markers can be displayed in any suitable shape that facilitates selection on a touchscreen 20. The time markers can be displayed in one color when selected and another color when not selected as described above. The time markers can also be displayed in one shape when selected and in another shape when not selected. It is also possible to show the time markers in the same color in the selected and unselected states. It is also possible to show the time markers after placement at a location, but not to show the time markers during a time marker placement. It is possible to display a time range after placement of the two associated time markers, but not to display the time range during the input process. The time range can be differentiated from the time bar 42 by using a different color or by using a different shape. For example, the time range can be displayed as extending above or below the time bar 42, or simply with an outline. The numeric time display 64 can display the time range numerically as it is being changed, or the time of the time marker that is currently being input or edited. It is also possible not to display a time range during the input or edit process. Time indicia can be used to display the time after the time markers are placed. The time indicia can also be omitted. The examples above are not intended to be limiting, and many other display variations are possible.

System Operation

Figure 9:
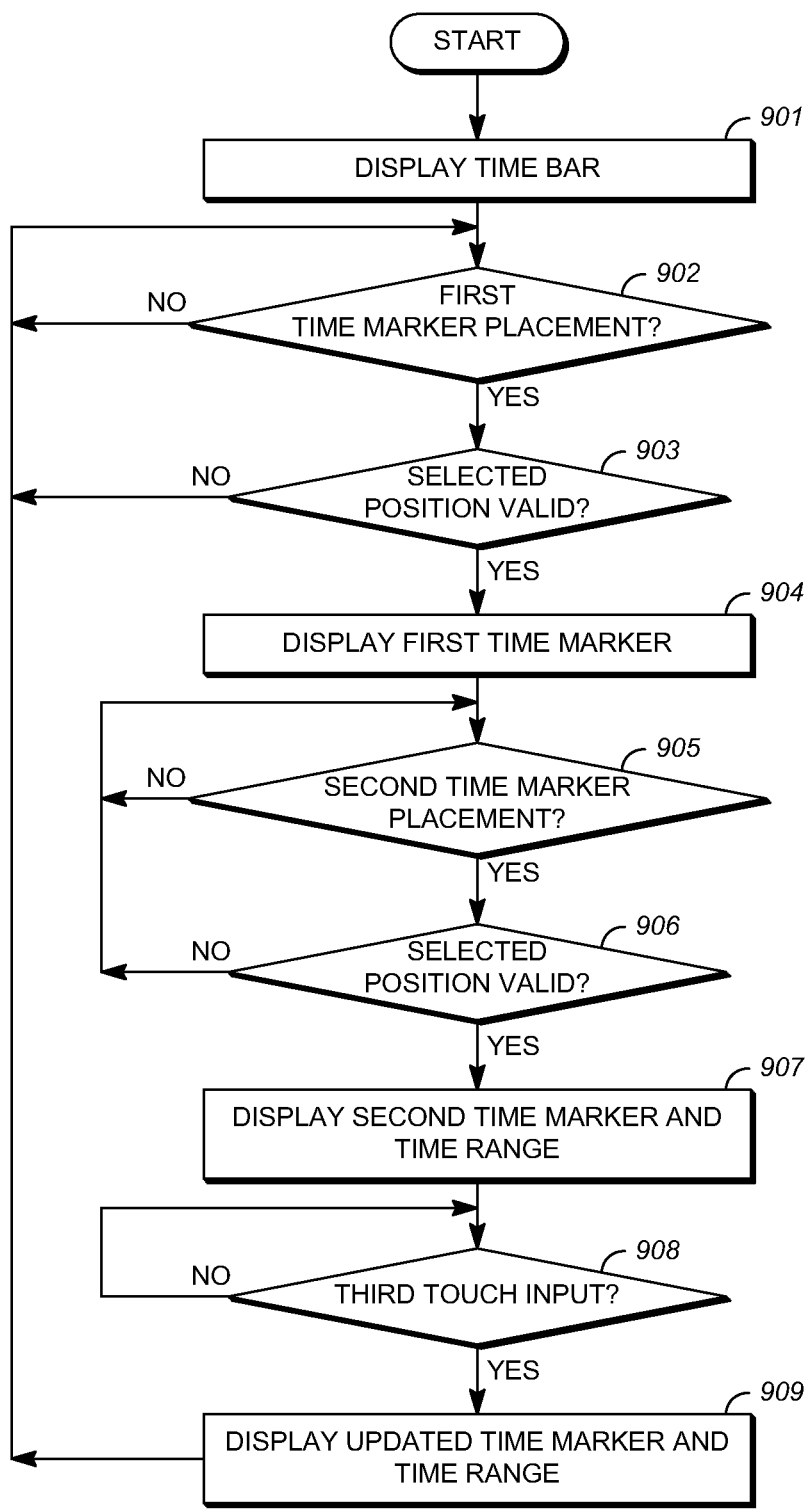
FIG. 9 is a flowchart showing an exemplary process for entering time ranges.

The flow chart in FIG. 9 shows an exemplary process for entering time ranges and is described in connection with FIGS. 4A-4C. The process below refers to entering time ranges by placing time markers on the time bar 42. In the description that follows, a time marker placement includes: receiving a touch input from the user at an initial position on the time bar 42, receiving an optional drag input from the initial position to a second position, and receiving a release input at a release position where the release position is the initial position if the time marker placement did not include a drag input and the second position if the time marker placement did include a drag input.

In step 901, the computing device 12 can display the time bar. As shown in FIG. 4A, the time bar 42 can include a left end 44 and a right end 46.

In step 902, the computing device 12 can determine whether a first time marker placement has been received as associated with a first touch input terminating at a first location on the time bar. If no time marker placement is received, the process continues step 902 until a first time marker placement is received. If a first time marker placement is received, the process proceeds to step 903.

In step 903, the computing device 12 can determine if the location selected by the first time marker placement received in step 902 is valid. The first time marker placement is valid if the release position of the first time marker placement is at a location not occupied by a previously entered time range. If the first time marker placement is not valid, the process returns to step 902. If the first time marker placement is determined to be valid in step 903, the process proceeds to step 904.

In step 904, the computing device 12 can define the first location to be the release position of the first time marker placement. The computing device 12 can display the first time marker at the first location. For example, as shown in FIG. 4A, the first time marker 72 is shown at the first location on time bar 42. The computing device 12 can display a time indicia below the first time marker. The time indicia can display numerically a first time corresponding to the first location. This state is illustrated in FIG. 4A as time indicia 76(*a*) as 08:00. The process then proceeds to step 905.

In step 905, the computing device 12 can determine whether a second time marker placement has been received as associated with a second touch input terminating at a second location on the time bar. If no second time marker placement is received, the process continues step 905 until a second time marker placement is received. If a second time marker placement is received, the process proceeds to step 906.

In step 906, the computing device 12 can determine if the location selected by the second time marker placement received in step 905 is valid. The second time marker placement is valid if the release position of the second time marker placement is at a location not occupied by a previously entered time range and there is no previously entered time range between the second time marker placement and the first location. If the second time marker placement is not valid, the process returns to step 905. If the second time marker placement is valid, the process proceeds to step 907.

In step 907, the computing device 12 can define the second location to be the release position of the second time marker placement. The computing device 12 can display a second time marker at the second location. For example, as shown in FIG. 4A, the second time marker 74 is shown at the second location on time bar 42. The computing device 12 can display a time range extending from the first time marker to the second time marker. This is shown as time range 70 in FIG. 4A. The computing device 12 can also display a time indicia below the second time marker. The time indicia can display numerically a second time corresponding to the second location. This state is illustrated in FIG. 4A as time indicia 76(*b*) at 11:00. The process then proceeds to step 908.

In step 908, the computing device 12 can determine whether a third touch input commencing at one of the first time marker and the second time marker and terminating at a third location has been received. For example, as shown in FIG. 4B the third touch input is to select second time marker 74, drag the second time marker 74 to the right, and release the second time marker 74. If no third touch input is received, the process continues step 908 until a third touch input is received. If a third touch input is received, the process proceeds to step 909.

In step 909, the computing device 12 can display one of the first time marker and the second time marker at the third location. The computing device 12 can also display a time indicia below one of the first time marker and the second time marker at the third location. The computing device 12 can also update one of the first time and the second time based on the position of the third location. The computing device 12 can also update the time range to include the updated on of the first time and the second time. For example, as shown in FIG. 4C, the second time marker 74 is now illustrated at the third location and indicated by time indicia 76(*c*) at 13:00. The time range 70 includes the first time marker 72 at 08:00 and the second time marker 74 at 13:00. The process can then return to step 902.

Implementation

FIG. 10 is a block diagram showing a conventional computing device 12. The computing device 12 can be in the form of a computing system including multiple computing devices, or in the form of a single computing device, for example, a mobile phone, a tablet computer, a laptop computer, a notebook computer, a desktop computer, and the like.

The computing device 12 can include a processor such as a central processing unit (CPU) 1010. The CPU 1010 in the computing device 12 can be a conventional central processing unit. Alternatively, the CPU 1010 can be any other type of device, or multiple devices, capable of manipulating or processing information now-existing or hereafter developed, including, for example, optical processors, quantum and/or molecular processors, general purpose processors, special purpose processors, IP cores, ASICS, programmable logic arrays, programmable logic controllers, microcode, firmware, microcontrollers, microprocessors, digital signal processors, memory, or any combination of the foregoing. In the claims, the term "processor" should be understood as including any of the foregoing, either singly or in combination. Although the disclosed embodiments can be practiced with a single processor as shown, e.g. CPU 1010, advantages in speed and efficiency can be achieved using more than one processor.

The computing device 12 can include memory 1020 in the form of random access memory (RAM). Any other suitable type of storage device can be used as the memory 1020. The memory 1020 can include code and data 1030 that is accessed by the CPU 1010 using a bus 1040. The memory 1020 can further include an operating system 1050 and application programs 1060, the application programs 1060 including programs that permit the CPU 1010 to perform the methods described here. For example, the application programs 1060 can include applications 1 through N which further include a time range input application that performs the methods described here.

The computing device 12 can also include a secondary storage 1070, which can, for example, be a memory card used with a mobile computing device 12. Because the time range input application may require a significant amount of information, it can be stored in whole or in part in the secondary storage 1070 and loaded into the memory 1020 as needed for processing.

The computing device 12 can also include a communication interface 1080. A communication interface 1080 is any manner of wired or wireless means of communication that is operable to send and receive data 1030 or other signals using a network. The communication interface 1080 can be coupled to the CPU 1010 via the bus 1040.

The computing device 12 can also include a touch sensitive display 1090 that combines a display with a touch sensitive element that is operable to sense touch inputs. As an example, the touch sensitive display 1090 can include a touchscreen 1092 that is positioned on top of a display 1094. The touchscreen 1092 can be approximately the same size as the display 1094 such that the touchable area of the touchscreen 1092 and the viewable area of the display 1094 are substantially coextensive. In this example, the touchscreen 1092 is a capacitive touchscreen. Other devices that permit a user to program or otherwise use the computing device 12 can be provided in addition to or as an alternative to a touch sensitive display 1090.

The touch sensitive display 1090 can be implemented in various ways, including by a liquid crystal display (LCD) or a cathode-ray tube (CRT) or light emitting diode (LED) display, such as an OLED display. Any suitable structures now known or later devised can also be employed as the touch sensitive display 1090. Example technologies that can be employed to generate a touch signal include resistive touch sensing, surface acoustic wave touch sensing, capacitive touch sensing, and other suitable technologies. Infrared sensing and other technologies that sense gestures can also be employed. References to objects (such as time displays and time markers) being "at" a location on the touchscreen 1092 should be understood as meaning at or near (e.g. within reasonable proximity to the location so as to be visually associated with the location).

Although FIG. 10 depicts the CPU 1010 and the memory 1020 of the computing device 12 as being integrated into single units, other configurations can be utilized. The operations of the CPU 1010 can be distributed across multiple machines (each machine having one or more of processors) which can be coupled directly or across a local area or other network. The memory 1020 can be distributed across multiple machines such as network-based memory or memory in multiple machines performing the operations of the computing device 12. Although depicted here as a single bus, the bus 1040 of the computing device 12 can be composed of multiple buses. Further, the secondary storage 1070 can be directly coupled to the other components of the computing device 12 or can be accessed via a network and can comprise a single integrated unit such as a memory card or multiple units such as multiple memory cards. The computing device 12 can thus be implemented in a wide variety of configurations.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method comprising:
displaying, on a touchscreen operatively coupled to a computing device, a time bar having a first end, a second end, and a spatial range intermediate to the first end and the second end;
receiving an indication of a first touch input entered at the touchscreen and terminating at a first location in the spatial range, wherein the first touch input is a tap input;
displaying, on the touchscreen, a first time marker at the first location;
receiving an indication of a second touch input entered at the touchscreen and terminating at a second location in the spatial range, wherein the second touch input is a tap input;
displaying, on the touchscreen, a second time marker at the second location;
displaying on the touchscreen an indication of a first time range extending from a first time defined based on a position of the first location in the spatial range to a second time defined based on a position of the second location in the spatial range;

receiving an indication of a third touch input entered at the touchscreen, initiated at the first end, and terminating at a third location in the spatial range;

displaying, on the touchscreen, a third time marker at the third location;

receiving an indication of a fourth touch input entered at the touchscreen, initiated at the second end, and terminating at a fourth location in the spatial range;

displaying, on the touchscreen, a fourth time marker at the fourth location; and displaying, on the touchscreen, an indication of a second time range extending from a third time defined based on a position of the third location in the spatial range to a fourth time defined based on a position of the fourth location in the spatial range.

2. The method of claim 1, wherein the spatial range corresponds to a temporal range, the first end of the time bar corresponds to the beginning of the temporal range and the second end of the time bar corresponds to the finish of the temporal range.

3. The method of claim 1, wherein displaying the first time marker further comprises:
displaying the first time marker in proximity to the initial position of the first touch input; and
animating the display of the first marker so that the first time marker tracks the first touch input to the first location.

4. The method of claim 1, wherein the first time marker and the second time marker are of a size sufficiently large to facilitate selection by the user on a touchscreen.

5. The method of claim 1, further comprising:
displaying the first time numerically near the first location; and
displaying the second time numerically near the second location.

6. The method of claim 1, further comprising:
displaying, in a first color, one or more portions of the time bar corresponding to one or more portions of the spatial range outside of the first time range and the second time range;
displaying, in a second color that is different from the first color, the indication of the first time range; and
displaying, in a third color that is different from the first color, the indication of the second time range.

7. The method of claim 1, further comprising:
receiving an indication of a fifth touch input entered at the touchscreen commencing at one of the first time marker and the second time marker and terminating at a fifth location in the spatial range;
displaying a numeric time display of the first time range in proximity to the time bar during the fifth touch input;
displaying on the touchscreen one of the first time marker and the second time marker at the fifth location;
updating one of the first time and the second time based on the position of the fifth location within the spatial range;
updating the first time range to include the updated one of the first time and the second time; and
updating the numeric time display to display the updated first time range including the updated one of the first time and the second time.

8. A method for accepting user input to remove at least one time range into a computing device having a touchscreen, comprising:

displaying on the touchscreen a time bar having a first end and a second end and a spatial range intermediate the first end and the second end;

receiving on the touchscreen a first touch input terminating at a first location in the spatial range;

displaying on the touchscreen a first time marker at the first location;

receiving on the touchscreen a second touch input terminating at a second location in the spatial range;

displaying on the touchscreen a second time marker at the second location;

identifying a first time based on the position of the first location within the spatial range;

identifying a second time based on the position of the second location within the spatial range;

identifying a time range including the first time and the second time;

receiving on the touchscreen a third touch input commencing at one of the first time marker and second time marker and terminating at the other one of the first time marker and second time marker; and removing the first time marker and the second time marker and the time range from the time bar.

9. The method of claim 8, wherein the spatial range corresponds to a temporal range, the first end of the time bar corresponds to the beginning of the temporal range and the second end of the time bar corresponds to the finish of the temporal range.

10. The method of claim 8, wherein displaying the first time marker further comprises:
displaying the first time marker in proximity to the initial position of the first touch input; and
animating the display of the first time marker so that the first time marker tracks the first touch input to the first location.

11. The method of claim 8, wherein the first time marker and the second time marker are of a size sufficiently large to facilitate selection by the user on a touchscreen.

12. The method of claim 8, further comprising:
displaying the first time numerically near the first location; and
displaying the second time numerically near the second location.

13. The method of claim 8 further comprising:
displaying, in a first color, one or more portions of the time bar corresponding to one or more portions of the spatial range outside of the time range in a first color; and
displaying, in a second color that is different from the first color, the time range.

14. A method for accepting user input to merge at least two time ranges into a computing device having a touchscreen, comprising:

displaying on the touchscreen a time bar having a first end and a second end and a spatial range intermediate the first end and the second end;

receiving on the touchscreen a first touch input terminating at a first location in the spatial range;

displaying on the touchscreen a first time marker at the first location;

receiving on the touchscreen a second touch input terminating at a second location in the spatial range;

displaying on the touchscreen a second time marker at the second location;

identifying a first time based on the position of the first location within the spatial range;

identifying a second time based on the position of the second location within the spatial range;

identifying a first time range including the first time and the second time;
receiving on the touchscreen a third touch input terminating at a third location in the spatial range;
displaying on the touchscreen a third time marker at the third location;
receiving on the touchscreen a fourth touch input terminating at a fourth location in the spatial range;
displaying on the touchscreen a fourth time marker at the fourth location;
identifying a third time based on the position of the third location within the spatial range;
identifying a fourth time based on the position of the fourth location within the spatial range;
identifying a second time range including the third time and the fourth time wherein the second time range is outside of the first time range;
receiving on the touchscreen a fifth touch input commencing at the second time marker and crossing over the nearest one of the third time marker and fourth time marker, and terminating at a fifth location that is within the second time range;
removing the second time marker and the nearest one of the third time marker and fourth time marker from the time bar; and
updating the first time range to include the first time and the furthest one of the third time and the fourth time.

15. The method of claim 14, wherein the spatial range corresponds to a temporal range, the first end of the time bar corresponds to the beginning of the temporal range and the second end of the time bar corresponds to the finish of the temporal range.

16. The method of claim 14, wherein displaying the first time marker further comprises:
displaying the first time marker in proximity to the initial position of the first touch input; and
animating the display of the first time marker so that the first time marker tracks the first touch input to the first location.

17. The method of claim 14, wherein the first time marker and the second time marker and the third time marker and the fourth time marker are of a size sufficiently large to facilitate selection by the user on a touchscreen.

18. The method of claim 14, further comprising:
displaying the first time numerically near the first location;
displaying the second time numerically near the second location;
displaying the third time numerically near the third location; and
displaying the fourth time numerically near the fourth location.

19. The method of claim 14 further comprising:
displaying, in a first color, one or more portions of the time bar corresponding to one or more portions of the spatial range outside of the first time range; and
displaying, in a second color that is different from the first color, the first time range.

20. The method of claim 14, further comprising:
displaying a numeric time display of the first time range in proximity to the time bar during the fifth touch input; and
updating the numeric time display to display the updated first time range including the first time and the furthest one of the third time and the fourth time.

21. An apparatus comprising:
a touchscreen; and
a processor in communication with the touchscreen and configured to:
display on the touchscreen a time bar having a first end and a second end and a spatial range intermediate the first end and the second end;
receive an indication of a first touch input entered at the touchscreen and terminating at a first location in the spatial range, wherein the first touch input is a tap input;
display, on the touchscreen, a first time marker at the first location;
receive an indication of a second touch input entered on the touchscreen and terminating at a second location in the spatial range, wherein the second touch input is a tap input;
display, on the touchscreen, a second time marker at the second location;
display, on the touchscreen, an indication of a first time range extending from a first time defined based on a position of the first location in the spatial range to a second time defined based on a position of the second location in the spatial range;
receive an indication of a third touch input entered at the touchscreen, initiated at the first end, and terminating at a third location in the spatial range;
display, on the touchscreen, a third time marker at the third location;
receive an indication of a fourth touch input entered at the touchscreen, initiated at the second end, and terminating at a fourth location in the spatial range;
display, on the touchscreen, a fourth time marker at the fourth location; and
display, on the touchscreen, an indication of a second time range extending from a third time defined based on a position of the third location in the spatial range to a fourth time defined based on a position of the fourth location in the spatial range.

* * * * *